US010127282B2

(12) United States Patent
Li et al.

(10) Patent No.: US 10,127,282 B2
(45) Date of Patent: Nov. 13, 2018

(54) PARTITIONABLE TERNARY CONTENT ADDRESSABLE MEMORY (TCAM) FOR USE WITH A BLOOM FILTER

(71) Applicant: Hewlett Packard Enterprise Development LP, Houston, TX (US)

(72) Inventors: Sheng Li, Palo Alto, CA (US); Kevin T. Lim, La Honda, CA (US); Dejan S. Milojicic, Palo Alto, CA (US); Paolo Faraboschi, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/305,960

(22) PCT Filed: Apr. 30, 2014

(86) PCT No.: PCT/US2014/036236
§ 371 (c)(1),
(2) Date: Oct. 21, 2016

(87) PCT Pub. No.: WO2015/167559
PCT Pub. Date: Nov. 5, 2015

(65) Prior Publication Data
US 2017/0046395 A1 Feb. 16, 2017

(51) Int. Cl.
*G11C 15/00* (2006.01)
*G06F 17/30* (2006.01)
*G06F 3/06* (2006.01)

(52) U.S. Cl.
CPC ...... *G06F 17/30495* (2013.01); *G06F 3/0604* (2013.01); *G06F 3/064* (2013.01); *G06F 3/0673* (2013.01); *G06F 17/3033* (2013.01); *G06F 17/30097* (2013.01); *G06F 17/30584* (2013.01)

(58) Field of Classification Search
CPC ... G11C 15/04; G11C 15/046; G11C 11/1675; G11C 5/06
See application file for complete search history.

(56) References Cited

U.S. PATENT DOCUMENTS 7,738,274 B1 * 6/2010 Nemati ................. G11C 15/04
365/115
8,032,529 B2 10/2011 Gupta et al.
(Continued)

OTHER PUBLICATIONS

Chen et at., Power efficient packet classification using cascaded bloom filter and off-the-shelf ternary CAM for OM networks,—ComputerCommunications, vol. 32, No. 2, pp. 349-356, Feb. 2009.
(Continued)

*Primary Examiner* — Tuan T Nguyen
(74) *Attorney, Agent, or Firm* — Hewlett Packard Enterprise Patent Department (57) ABSTRACT

A bit vector for a Bloom filter is determined by performing one or more hash function operations on a set of ternary content addressable memory (TCAM) words. A TCAM array is partitioned into a first portion to store the bit vector for the Bloom filter and a second portion to store the set of TCAM words. The TCAM array can be searched using a search word by performing the one or more hash function operations on the search word to generate a hashed search word and determining whether bits at specified positions of the hashed search word match bits at corresponding positions of the bit vector stored in the first portion of the TCAM array before searching the second portion of the TCAM array with the search word.

15 Claims, 7 Drawing Sheets

(56) References Cited

U.S. PATENT DOCUMENTS

| | | | | |
|---|---|---|---|---|
| 9,727,459 | B2* | 8/2017 | Khoueir | G06F 12/06 |
| 9,847,132 | B1* | 12/2017 | Zheng | G11C 15/046 |
| 2007/0115986 | A1 | 5/2007 | Shankara | |
| 2008/0133583 | A1 | 6/2008 | Artan et al. | |
| 2010/0023727 | A1* | 1/2010 | Lim | H04L 45/00 |
| | | | | 711/216 |
| 2010/0098081 | A1 | 4/2010 | Dharmapurikar et al. | |
| 2012/0275466 | A1 | 11/2012 | Bhadra et al. | |
| 2013/0188409 | A1 | 7/2013 | Soyata | |
| 2015/0006808 | A1* | 1/2015 | Miller | G11C 15/00 |
| | | | | 711/108 |
| 2016/0054940 | A1* | 2/2016 | Khoueir | G06F 12/0638 |
| | | | | 706/15 |

OTHER PUBLICATIONS

Hao, F. et al, Building High Accuracy Bloom Filters Using Partitioned Hashing, (Research Paper), < http://dl.acm.org/ft_gateway.cfm?id=1254916&ftid=425265&dwn=1&CFID=426392285&CFTOKEN=64756604 >. Jun. 12-16, 2007, 11 Pgs.

Lim, H. et al., On Adding Bloom Filters to Longest Prefix Matching Algorithms, (Research Paper), < http://ieeexplore.ieee.org/stamp/stamp.jsp?arnumber=6263242 >, Feb. 2014, pp. 411-423, vol. 63, No. 2.

PCT Search Report/Written Opinion ~ Application No. PCT/US2014/036236 dated Dec. 12, 2014 ~ 10 pages.

Yu, F. et al., Gigabit Rate Packet Pattern-matching Using TCAM, (Research Paper), < http://,www.ieee-icnp.org/2004/papers/5-1.pdf >, Jul. 15, 2004, 10 Pgs.

Goel, A., et al.; "Small Subset Queries and Bloom Filters Using Ternary Associative Memories, with Applications"; in SIGMETRICS 2010; 12 pages.

Guo, Q., et al.; "A Resistive TCAM Accelerator for Data-Intensive Computing"; Dec. 3-7, 2011; 12 pages.

Guo, Q., et al.; "AC-DIMM: Associative Computing with STT-MRAM", in ISCA 2013; 12 pages.

\* cited by examiner

PARTITIONABLE TERNARY CONTENT ADDRESSABLE MEMORY (TCAM) FOR USE WITH A BLOOM FILTER

BACKGROUND

Pattern matching operations are critical to many applications, such as in high speed networks or in rule engines for event processing. Ternary content addressable memory (TCAM) devices have been used for performing pattern matching operations, albeit in simpler pattern matching operations. TCAM devices, however, have high power consumption and are inefficient in performing large volume and complex pattern matching.

DETAILED DESCRIPTION

Examples described herein provide for a system, such as a search system, to partition a ternary content addressable memory (TCAM) array to store both a bit vector for a Bloom filter and a set of TCAM words for performing search operations. As described herein, a TCAM word can correspond to a target pattern that is stored in a row of TCAM array. For example, the system can designate or partition the TCAM array into a first portion to store the bit vector and a second portion to store the set of TCAM words. The system can monitor the performance of the search operations in order to dynamically adjust the size of the first and second portions of the TCAM array. In this manner, the system can use the Bloom filter to reduce the number of search operations that are performed on the TCAM array, while also adjusting the size of the Bloom filter in order to improve search and power efficiency of the TCAM array.

In some examples, a bit vector for a Bloom filter can be constructed or determined by performing one or more hash function operations on each of a set of TCAM words. As used herein, a TCAM word is a set of data bits that corresponds to a particular pattern and can be stored in a TCAM array. For example, the TCAM array can include a plurality of TCAM cells that are organized in a number of rows and columns. A row of TCAM cells can be used to store a TCAM word. Accordingly, the TCAM array can store a plurality of different TCAM words, with each TCAM word being stored in a different row of TCAM cells. In addition, the bit vector can also be stored in one or more rows of the TCAM array.

According to one example, a control module is coupled to a search engine, which includes a TCAM array. The control module can determine the bit vector for a Bloom filter for a set of TCAM words by performing one or more hash function operations to each of the set of TCAM words, and can partition the TCAM array into a first portion and a second portion (e.g., the remaining portion of the TCAM array). The first portion can be used to store the bits of the bit vector for the Bloom filter and the second portion can be used to store the set of TCAM words. The control module can determine the size of the first portion (e.g., the number of rows of the TCAM array) based on the bit vector, and can dynamically adjust the size of the first portion based on the results of search operations. In this manner, the system can control a dynamically partitionable hybrid TCAM array that stores both the bit vector for the Bloom filter and the set of TCAM words for the search engine.

The control module can receive a search word in order to perform a search in the TCAM array. In some examples, the control module can perform a search in the TCAM array by performing the one or more hash function operations to the search word and determining whether the bits of the hashed search word are in the first portion of the TCAM array (e.g., whether the bits of the hashed search word match the bits of the bit vector) before searching the second portion of the TCAM array with the search word. Accordingly, the second portion of the TCAM array can be searched using the search word only when the Bloom filter indicates that the search word may be found in the set of TCAM words stored in the second portion, thereby reducing the number of search operations performed in the TCAM array.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device, such as non-transitory computer-readable media. A programmatically performed step may or may not be automatic.

One or more examples described herein can be implemented using programmatic modules, engines, or components. A programmatic module, engine, or component can include a program, a sub-routine, a portion of a program, or a software component and/or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices, such as servers, desktop computers, cellular or smartphones, personal digital assistants (e.g., PDAs), laptop computers, printers, digital picture frames, network equipment (e.g., routers), or tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable media on which instructions for implementing examples can be carried and/or executed. In particular, the numerous machines shown with examples include processor(s) and various forms of memory for holding data and instructions. Examples of computer-readable media include permanent memory storage devices, such as hard drives on personal computers or servers. Other examples of computer storage media include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable media. Additionally, examples may be implemented in the form of computer-programs, or a computer usable carrier medium capable of carrying such a program.

System Description

Figure 1:
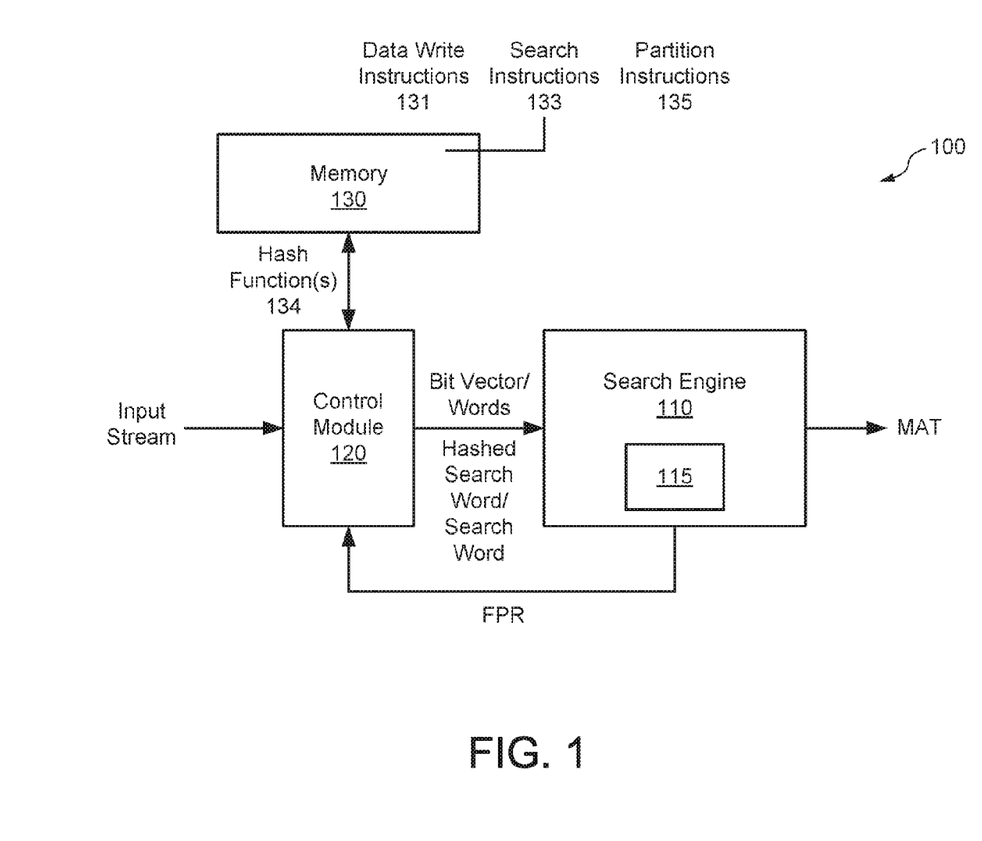
FIG. 1 illustrates an example block diagram of a computing device to dynamically partition a ternary content addressable memory (TCAM) array for purposes of performing search operations.

FIG. 1 illustrates an example block diagram of a computing device to dynamically partition a TCAM array for purposes of performing search operations. In some examples, the computing device can include or implement a search system 100 that includes a search engine 110, a control module 120, and a memory 130. The search engine 110 can include a TCAM array 115 to store a plurality of TCAM words as well as a bit vector for a Bloom filter. According to an implementation, the search engine 110 can be a TCAM device that is used in network switching and routing applications, such as to determine forwarding destinations for data packets. A TCAM device can be instructed to compare a selected portion of an incoming packet with TCAM words stored in the TCAM array 115 within the TCAM device.

According to an example, the control module 120 can include one or more processors and/or one or more memory controllers for writing data to the TCAM array 115 and for performing search operations on the TCAM array 115. The control module 120 (e.g., the one or more processors and/or one or more memory controllers) can execute instructions stored in memory, such as the memory 130, to perform process steps described herein. For example, the memory 130 can store data write instructions 131, search instructions 133, and/or partition instructions 135 that, when executed by the control module 120, cause the search system 100 to determine what data to write to the TCAM array 115 and to store the data to the TCAM array 115, to perform search operations on the TCAM array 115 using a particular search word, and/or to dynamically partition the TCAM array 115, respectively. In alternative implementations, hard-wired circuitry may be used in place of or in combination with software instructions to implement examples described herein. Thus, the examples described are not limited to any specific combination of hardware circuitry and software.

Figure 3A:
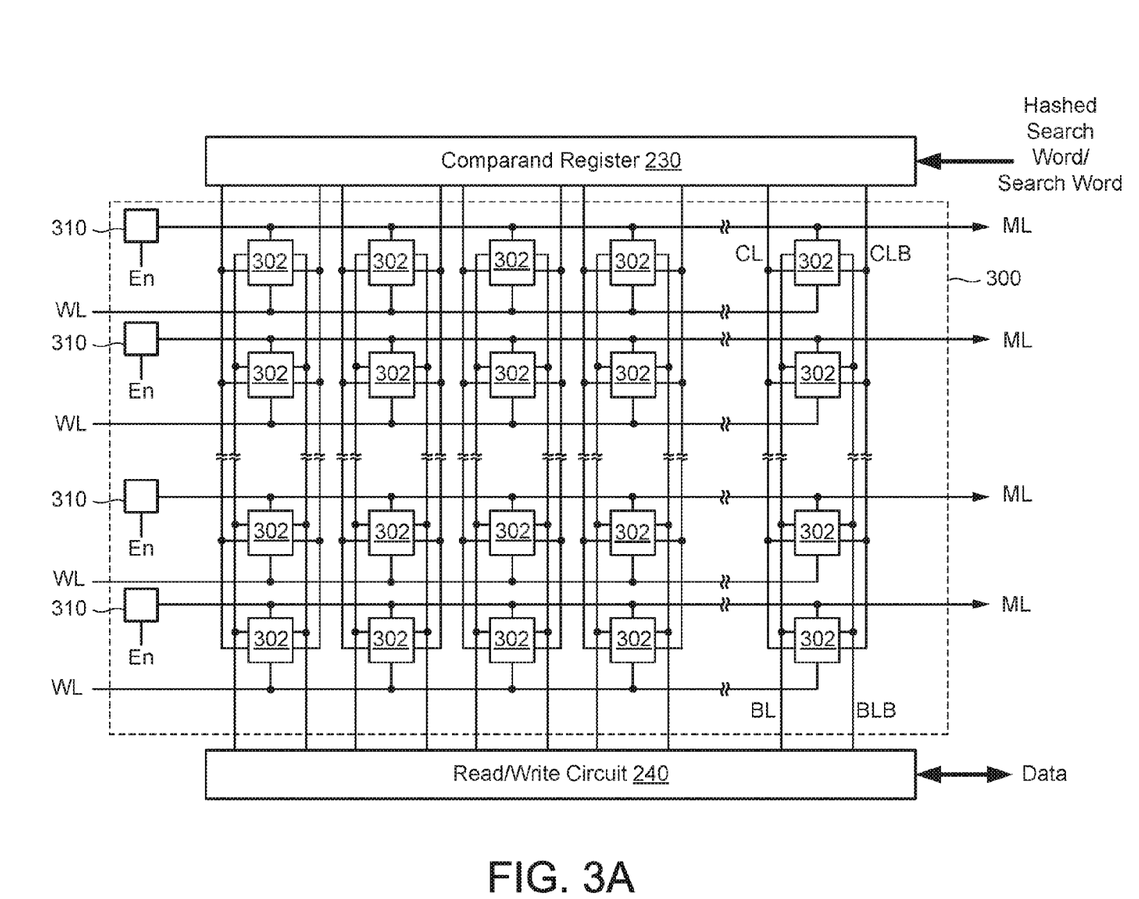
FIGS. 3A through 3C are example block diagrams of a dynamically partitionable TCAM array in accordance with examples of FIGS. 1 and 2.

In one example, the TCAM array 115 can include a plurality of TCAM cells that are organized in a number of rows and columns (see, for example, FIG. 3A). Each row of TCAM cells is coupled to a corresponding match line that indicates match results for the row based on the search word. Each row of TCAM cells can also be used to store a TCAM word or at least a portion of a bit vector of a Bloom filter. For example, the TCAM array 115 can include 512 rows of TCAM cells, with each row having 256 TCAM cells (e.g., capable of storing a 256-bit data word). In this case, the TCAM array 115 can store bits of a bit vector for a Bloom filter in a set of TCAM rows (e.g., 4 rows) and store a set of TCAM words in the remaining set of TCAM rows (e.g., 508 rows).

Depending on implementation, the control module 120 can use a Bloom filter to perform search operations in conjunction with the search engine 110. A Bloom filter is a data structure that can be used to determine whether a particular search word is found (or exists) in a set of words (e.g., is the search word a member of the set of TCAM words?). The Bloom filter can indicate either possible positive matches (e.g., indicate that the search word may be found in the set of words) or negative matches (e.g., indicate that the search word is not found in the set of words) in response to a query (e.g., the inputted search word). The search system 100 can construct and use a Bloom filter to eliminate a majority of non-matching search words before performing a search on the set of TCAM words stored in the TCAM array 115.

For example, the control module 120 can determine a bit vector (or data structure) for the Bloom filter by determining a set of TCAM words that are to be stored in the TCAM array 115 (e.g., n number of TCAM words for illustrative purposes). The control module 120 can also access the memory 130 to identify one or more hash functions 134 (e.g., three different hash functions) to use to construct the bit vector for the Bloom filter. Each of the hash functions 134 can map or point to a bit of the bit vector and more than one of the hash functions 134 can map to the same bit position. The set of TCAM words can be added to the Bloom filter by performing the hash operation(s) using the one or more hash functions 134 (e.g., three hash functions) on each of the TCAM words in the set. For example, a bit vector can have M bits, where M is a positive integer and can be a predefined or user-configured/adjustable value. Initially, before any TCAM words are added to the Bloom filter, all the M bits in the bit vector can be set to 0 (e.g., a logical low). The control module 120 can also identify K hash functions, where K is a positive integer and can be a predefined or user-configured/adjustable value, with each hash function to map or hash each TCAM word in the set to one of the M bit vector positions. When a TCAM word is hashed using each of the K hash functions, a number of positions of the bit vector (e.g., K number of positions or less than K number if more than one hash function mapped to the same bit position) are set to 1 (e.g., a logical high). Each TCAM word in the set of TCAM words can be added to the Bloom filter by hashing each TCAM word using each of the K hash functions. Once the bit vector for the Bloom filter is constructed or determined, the control module 120 can store the bit vector in a portion of the TCAM array 115.

The control module 120 can partition the TCAM array 115 into a first portion and a second portion. The bit vector can be stored in the first portion, for example, while a plurality of TCAM words of the set of TCAM words can be stored in the second portion. In one example, the control module 120 can determine the size of the bit vector (e.g., M bits) and based on the size of the bit vector, determine the size of the first portion (e.g., the number of TCAM rows that are needed to store the bit vector). Referring back to the example above, the TCAM array 115 can include 512 rows of TCAM cells, with each row having 256 TCAM cells. If the bit vector is a 512-bit array, the control module 120 can determine (e.g., by executing the partition instructions 135) that two rows of TCAM cells are necessary to store the bit vector. As another example, if the bit vector is a 400-bit array, the control module 120 can determine that two rows of TCAM cells are necessary to store the bit vector, but that not all TCAM cells of the second row will be used to store the bit vector. In such case, the control module 120 can store the remaining TCAM cells of the second row with "X" or "don't care" bits, such as discussed below (see FIG. 3A). The control module 120 can partition the TCAM array 115 into a first portion having a size of two rows of TCAM cells and a second portion (e.g., the remaining rows of the TCAM array). The control module 120, by executing the data write instructions 131, for example, can store the bit vector in the designated first portion of the TCAM array 115 and the set of TCAM words in the second portion of the TCAM array 115.

Depending on implementation, the total number of the set of TCAM words (e.g., 508 TCAM words) that are added to the Bloom filter in addition to the total number of rows to store the bit vector should not exceed the total number of rows of the TCAM array 115. When performing the data write and partitioning processes, the control module 120 can ensure that the bit vector can be stored along with the set of TCAM words in the TCAM array 115. For example, referring to the example above, the control module 120 can determine the size of the bit vector (e.g., M bits) before performing the hashing of a set of TCAM words. If the control module 120 identifies that 8 rows of TCAM cells are needed to store the bit vector, the control module 120 can identify the number of the set of TCAM words that are added to the Bloom filter to not exceed 504 TCAM words (e.g., 512 TCAM rows less 8 TCAM rows). After the bit vector and the set of TCAM words are stored in the TCAM array 115, the control module 120 can perform search operations, when necessary, based on the input stream received by the search system 100.

The control module 120 can receive an input stream, that includes, for example, incoming packets that are to be routed to another port and/or device. In one example, the control module 120 can extract header information from each packet to identify which flow the packet belongs to, and forward the packets to the search engine 110 for search operations. During a search or compare operation, the search word (e.g., the comparand word) can typically be provided to the search engine 110 and compared with the TCAM words stored in the TCAM array 115. Before the search word is compared with the set of TCAM words stored in the TCAM array 115, however, the control module 120 can first perform K number of hash function operations using the K hash functions 134. The search word can be hashed to result in the hashed search word. This hashed search word can be compared with the bit vector of the Bloom filter stored in the first portion of the TCAM array 115 before the second portion of the TCAM array 115 is searched with the search word.

For example, the hashed search word can have K bit positions (or less than K bit positions if multiple hash functions map to the same bit position of a bit vector), with each of the bits at the K positions being set to 1 (e.g., logical high). The control module 120 can then set the remaining bits of the hashed search word as "X" or "don't care" bits. These K bit positions of the hashed search word are compared to the bit vector stored in the first portion of the TCAM array 115. If any of the bits at these corresponding positions in the bit vector are 0 (e.g., do not match), then the search word is determined to not be in the set of TCAM words. The search engine 110 outputs a match signal, MAT, indicating, in this case, that no match is found with respect to the first portion of the TCAM array 115. The control module 120 can receive the MAT signal (e.g., no match) and the search engine 110 is not instructed to perform a search of the second portion of the TCAM array 115. In this manner, the Bloom filter can be used to prevent unnecessary searching of the TCAM words in the second portion of the TCAM array 115.

On the other hand, if the K bit positions of the hashed search word are each 1 in the corresponding positions of the bit vector (e.g., match), then the search word is determined to possibly be included in the set of TCAM words and an additional search of the second portion of the TCAM array 115 is needed. The control module 120 can receive the MAT signal (e.g., match) and can then instruct the search engine 120 to perform a search of the second portion of the TCAM array 115 using the search word. In this manner, by eliminating the majority of non-matching searches before passing search words to the second portion of the TCAM array 115, the set of words in the second portion is only searched by search words having a high matching potential. This reduces the frequency of searching the set of words in the second portion, thereby improving power-efficiency of the search engine 110.

According to examples, the control module 120 can also dynamically adjust the Bloom filter and/or dynamically re-partition (if necessary) the TCAM array 115 based on feedback information from the search engine 110, such as a false positive rate (FPR) or other matching result information. In some instances, the set of TCAM words that are to be stored in the TCAM array 115 can be changed and/or one or more of the K hash functions can be changed. In such cases, the control module 120 can reconstruct the Bloom filter to be stored in the first portion of the TCAM array 115.

In another example, the control module 120 can balance the capacity of the TCAM array 115 to store both the bit vector for the Bloom filter and the set of TCAM words in order to reduce the amount of unnecessary (and power-consuming) searches of the second portion of the TCAM array 115. In one example, the control module 120 can compare the FPR with a predefined threshold value (e.g., 5%) to determine whether to dynamically adjust the Bloom filter and/or to dynamically re-partition the TCAM array 115. The predefined threshold value can be dynamically configured by users and/or configured based on work load to minimize the full search frequency in the second portion of the TCAM array 115. This predefined threshold value can be used to balance the capacity, performance, and/or power-efficiency of the search engine 100, for example, as increasing the size of the Bloom filter results in less capacity for the set of TCAM words, and vice versa.

For example, if the current Bloom filter is resulting in a high rate of false positive results (e.g., the rate of searches of hashed search words results in possible matches of the corresponding search words in the set of TCAM words, but when the set of TCAM words are searched using the search words, no match is found), the control module 120 can dynamically adjust the Bloom filter to be larger and/or use additional hash functions to reduce the rate of false positive results. The size of the first portion of the TCAM array 115 can also be dynamically adjusted accordingly. Similarly, the control module 120 can also dynamically reduce the size of the Bloom filter and reduce the size of the first portion of the TCAM array 115 (and increase the size of the second portion) based on the feedback information from the search engine 110. Although the examples described in FIG. 1 refer to TCAM words and a TCAM array, other examples can use binary CAM words and CAM array as opposed to ternary CAMs.

Figure 2:
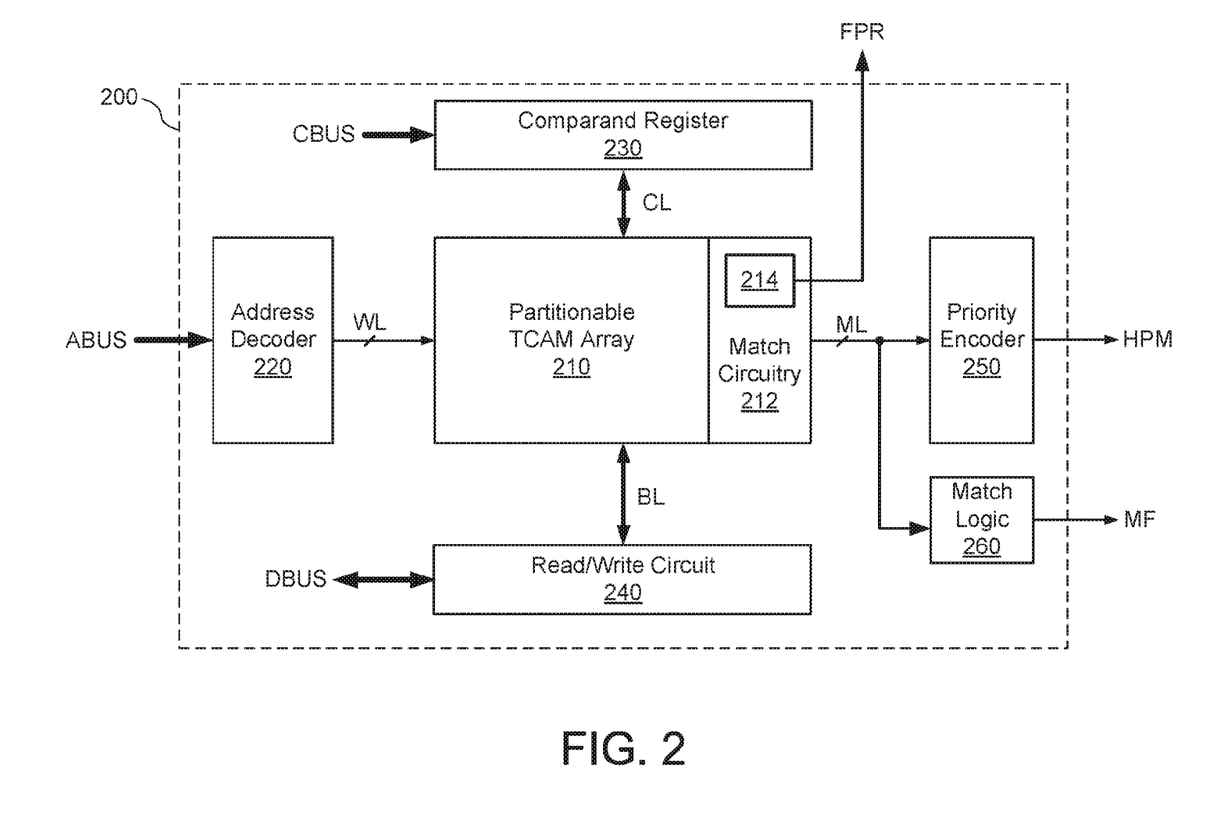
FIG. 2 illustrates an example block diagram of a TCAM device in accordance with examples of FIG. 1.

FIG. 2 illustrates an example block diagram of a TCAM device in accordance with examples of FIG. 1. For example, in one implementation, TCAM device 200 can correspond to the search engine 110 of FIG. 1. The TCAM device 200 includes a partitionable TCAM array 210, an address decoder 220, a comparand register 230, a read/write circuit 240, a priority encoder circuit 250, and match logic 260. Components of the TCAM device 200 can communicate with the control module 120 (not shown in FIG. 2) in order to (i) write data of a bit vector for a Bloom filter and data of a set of TCAM words to the TCAM array 210, (ii) perform a search operation of the Bloom filter in the first portion of the TCAM array 210 before performing a search operation of the second portion of the TCAM array 210, and/or (iii) dynamically re-partition the TCAM array 210 and/or the Bloom filter.

The TCAM array 210 includes a number of rows of TCAM cells (not shown for simplicity in FIG. 2), where each row of TCAM cells is to store a data word (e.g., a TCAM word or at least a portion of the bit vector of the Bloom filter). One or more instructions and related control signals may be provided to TCAM device 200 from an instruction decoder (not shown for simplicity) to control read, write, compare, and other operations for TCAM device 200. Other well-known signals that can be provided to TCAM device 200, such as enable signals, clock signals, and power connections, are not shown for simplicity.

Each row of TCAM cells (not shown in FIG. 2 for simplicity) in the TCAM array 210 is coupled to the address decoder 220 via a corresponding word line, WL, and to the priority encoder 250 and match logic 260 via a corresponding match line, ML. For simplicity, the word lines and match lines are represented collectively in FIG. 2. The address decoder 220 includes circuitry to select corresponding rows in TCAM array 210 for read, write, and/or other operations in response to an address received from an address bus, ABUS, using the word lines, WL. For other examples, addresses may be provided to the address decoder 220 from another suitable bus and/or circuitry. For example, the address decoder 220 can receive from the control module 120 via the address bus, ABUS, the address(es) for the row(s) of the TCAM array 210 for the first portion of the TCAM array 210 to store the bit vector for a Bloom filter.

For a data write operation, the control module 120 can partition the TCAM array 210 into a first portion and a second portion by using address information of the rows of the TCAM array 210. The control module 120 can construct a Bloom filter for a set of TCAM words, as discussed above, and can cause the bits of the bit vector to be written to the first portion of the TCAM array 210. The read/write circuit 240 includes write drivers to write data received from a data bus, DBUS, to the TCAM array 210 via the bit lines, BL, and can include sense amplifiers to read data from the TCAM array 210 onto DBUS. For example, when the bit vector is to be written to the first portion of the TCAM array 210, the control module 210 can provide address(es) for the row(s) of the TCAM array 210 for the first portion to the address decoder 220 and also provide the data bits of the bit vector, via the DBUS, to the read/write circuit 240. The read/write circuit 240 can write the bit vector to the appropriate address(es) of the row(s) of the first portion of the TCAM array 210. Similarly, the control module 120 can provide the addresses for the rows of the second portion of the TCAM array 210 to the address decoder 220 and the data bits of the set of TCAM words that are to be stored in the second portion to the read/write circuit 240. The read/write circuit 240 can write the data of the set of TCAM words to the appropriate addresses of the rows of the second portion of the TCAM array 210.

Each column of TCAM cells (not shown in FIG. 2 for simplicity) in the TCAM array 210 is coupled to the comparand register 230 via one or more corresponding comparand lines CL, and is coupled to the read/write circuit 240 via one or more corresponding bit lines BL. For simplicity, the comparand lines, CL, and the bit lines, BL, are represented collectively in FIG. 2. The comparand register 230 can first provide a hashed search word received from a comparand bus, CBUS, from the control module 120 to the TCAM array 210 during compare operations with data stored in the first portion of the TCAM array 210. If the first search operation of the hashed search word indicates that the search word may be found in the set of TCAM words stored in the second portion of the TCAM array 210, the comparand register 230 can then provide the search word to the TCAM array 210 during compare operations with data stored in the second portion of the TCAM array 210.

The match lines, ML, provide match results for compare operations between comparand data (e.g., a search word or the hashed search word) and data stored in the TCAM array 210. For example, if the search of the Bloom filter with the hashed search word (e.g., compare operation of the first portion of the TCAM array 210) indicates that the search word may be found in the set of TCAM words stored in the second portion of the TCAM array 210, the match logic 260 can use the match results indicated on the match lines to generate a match flag (MF) indicative of a match condition in the TCAM array 210. The control module 120 can receive the match flag and cause TCAM device 200 to perform a full search (e.g., a second subsequent search) of the second portion of the TCAM array 210 using the search word. The comparand register 230 can then provide the search word to the TCAM array 210 during compare operations with data stored in the second portion of the TCAM array 210. Again, the match logic 260 can use the match results indicated on the match lines to generate a match flag indicative of a match condition in the TCAM array 210. If there is more than one matching entry in the TCAM array 210, the match logic 260 may generate a multiple match flag to indicate a multiple match condition. Still further, in some examples, the priority encoder 250 uses the match results indicated on the match lines to determine the matching entry that has the highest priority number associated with it and generates the index or address of this highest priority match (HPM).

In some examples, the TCAM array 210 also includes match circuitry 212. The match circuitry 212 can include a plurality of match latches, for example, where each match latch is coupled to the match line, ML, of a corresponding row of TCAM cells, and is used to store the match state of the corresponding TCAM row during compare operations. The match circuitry 212 can also include counter circuitry 214 that use counters to count the miss frequency (or miss rate) of all search operations in the second portion of the TCAM array 210. The counter circuitry 214 can be coupled to the match lines of the TCAM array 210. Because all search requests are first filtered by the Bloom filter before the second portion of the TCAM array 210 is searched, the miss frequency of all search operations in the second portion can correspond to the false positive frequency (or FPR) of the Bloom filter itself. The counter circuitry 214 can provide the FPR to the control module 120 so that the control module 120 can dynamically adjust or resize the Bloom filter (and if necessary, the sizes of the first and second portions of the TCAM array 210) based on the FPR.

As an addition or an alternative, the counter circuitry 214 can also use counters to count TCAM words that match search words during compare operations in order to determine which TCAM words are more frequently used or accessed (as compared to other TCAM words in the set of TCAM words). This information can be provided to the control module 120. For example, the size of the TCAM array 210 can be an inherent limitation to a computing device. Only a certain number of TCAM words may be stored in the TCAM array 210. Accordingly, the control module 120 can use information about which TCAM words are more frequently used (e.g., are "hot" TCAM words) as compared to other TCAM words that are not frequently used (e.g., are "cold" TCAM words) in order to remove individual TCAM words that are not frequently used from the set of TCAM words stored in the second portion of the TCAM array 210 and insert TCAM words that are more frequently used (e.g., swap out). A TCAM word that is accessed or matched at least a predetermined threshold amount of times (x number of times) over a course of a duration (e.g., the last certain amount of time) can be classified to be "hot," whereas a TCAM word that is accessed or matched less than a predetermined threshold amount of times (or even less than a second, lower, predetermined threshold amount of times) over a course of the duration can be classified to be "cold." In one example, the control module 120 can rank the TCAM words in order of frequency during a specified duration to determine which TCAM words are to be removed or not stored in the TCAM array (e.g., the ten lowest frequently used TCAM words). TCAM words that are not stored in the TCAM array can be searched independently, for example, using other resources of the system 100, such as RAM.

When TCAM words are to be swapped out by the control module 120, the control module 120 can re-partition the TCAM array 210, if necessary, and reconstruct the Bloom filter using the newly determined set of TCAM words. The control module 120 can then perform a write operation of data of the bit vector for the reconstructed Bloom filter and data of the newly determined set of TCAM words in the TCAM array 210.

In one example, the control module 120 can also implement a hierarchical memory access process in which it uses the TCAM device 200 to perform compare (search) operations for those TCAM words that are "hot," and use other components of the search system 100 or other devices (not shown in FIG. 1 or 2 for simplicity) to perform compare operations for those TCAM words that are "cold." Because searching the TCAM device 200 for target patterns stored in TCAM words can be much faster than using other components, such as RAM, to search for target patterns, for example, the control module 120 can enable searches for "hot" TCAM words to be more quickly and efficiently performed using the TCAM device 200. In this manner, the control module 120 can enable hierarchical TCAM management in order to achieve energy efficiency and performance.

Figure 3B:
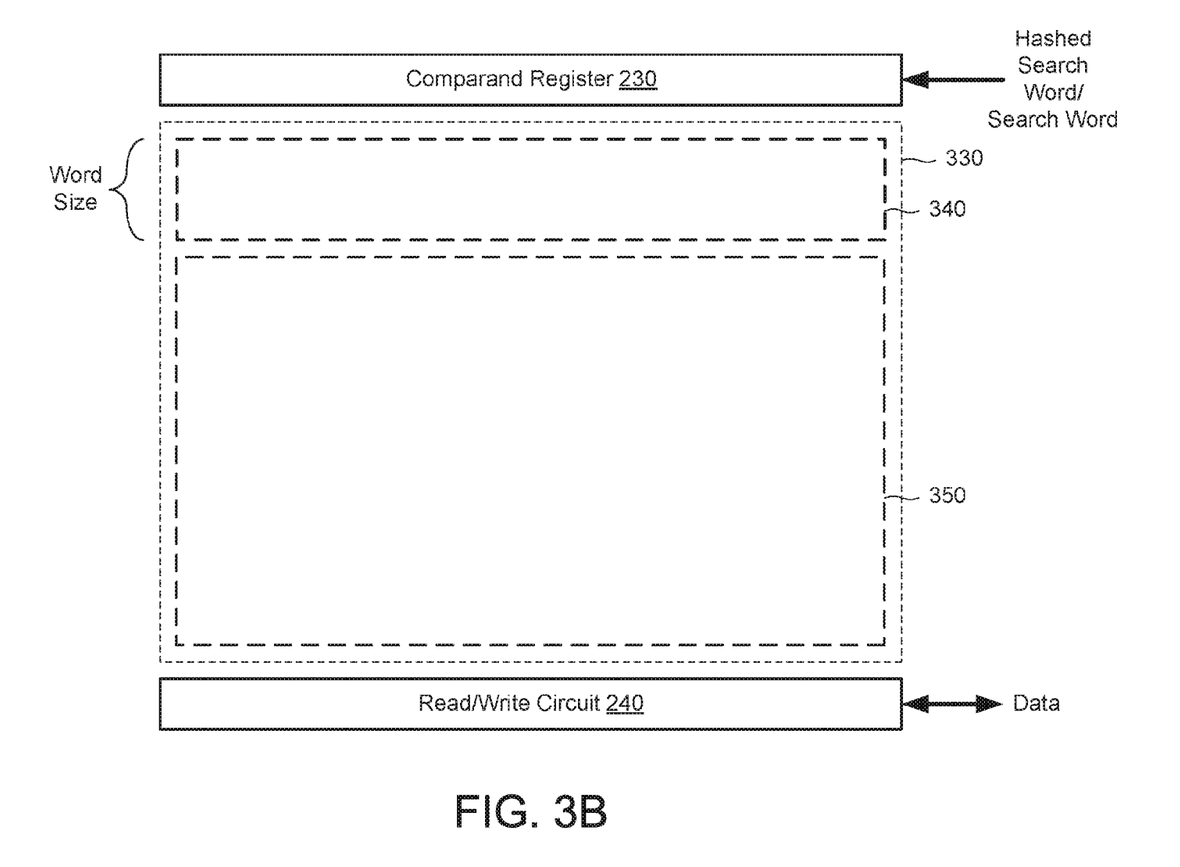
Figure 3C:
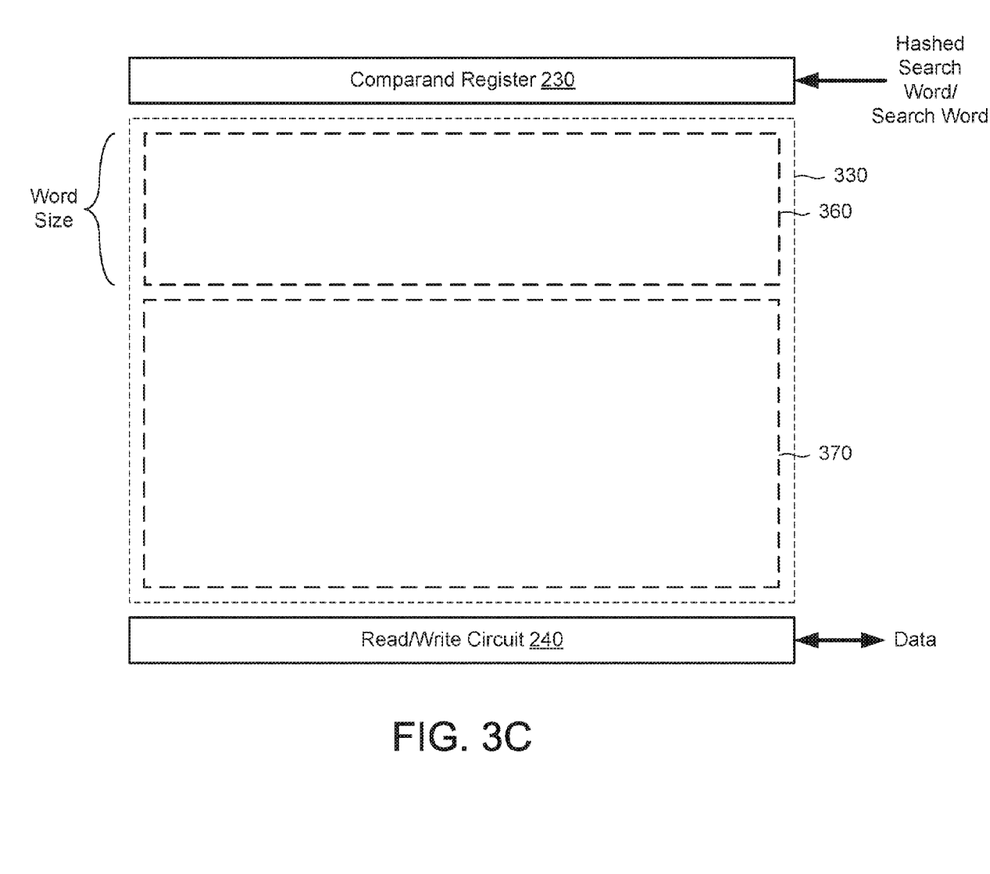

FIGS. 3A through 3C are example block diagrams of a dynamically partitionable TCAM array in accordance with examples of FIGS. 1 and 2. FIG. 3A illustrates a TCAM array 300 that is one example of the TCAM array 115 of FIG. 1. The TCAM array 300 includes a plurality of TCAM cells 302 organized in any number of rows and columns. TCAM cells 302 may be any suitable SRAM-based, DRAM-based, or non-volatile CAM cell. In addition to supporting the searching of data words consisting of 1s and 0s, a TCAM cell 302 allows a third matching state as a wildcard (X) or "don't care" bit in the stored data word. A TCAM cell 302 can store a wildcard, where a search of either a 1 or a 0 for that TCAM cell 302 results in a match.

Referring back to FIG. 3A, each row of TCAM cells 302 is coupled to a match line, ML, and to a word line, WL. Each word line, WL, is driven by the address decoder 220 (see FIG. 2) to select one or more rows of TCAM cells 302 for writing or reading. Each match line, ML, provides the match results of a compare operation between the search word and a TCAM word stored in the corresponding row of TCAM cells 302 to the priority encoder 250 and to the match logic 260 (see FIG. 2). Each column of TCAM cells 302 in the TCAM array 300 is coupled to a complementary bit line pair BL and BLB and to a complementary comparand line pair CL and CLB. The bit line pairs BL/BLB are each coupled to the read/write circuit 240, and the comparand line pairs CL/CLB are each coupled to the comparand register 230.

When data is to be written to the TCAM array 300, the control module 120 can communicate the data to the read/write circuit 240 and communicate with the address decoder 220 to control which rows are to store which data. For example, the control module 120 determines a set of TCAM words to write to the TCAM array 300. The control module 120 can first construct a Bloom filter by performing one or more hash function operations on each of the set of TCAM words to determine a M-bit vector for the Bloom filter. Depending on the size of the M-bit vector and the size of the TCAM array 300, the control module 120 can determine a size of the first portion of the TCAM array 300 in which to store the data of the bit vector. If M is less than or equal to the number of bits of a single TCAM word (e.g., a single row of TCAM cells 302), the data of the bit vector can be stored in a row. This row can correspond to the first portion of the TCAM array 300.

For example, if M is 128 bits and there are 256 TCAM cells 302 in each row of the TCAM array 300, the bit vector can be stored in the first row of the TCAM array 300 and the remaining 128 bits can be stored as wildcard bits (e.g., "X") or "don't care" bits. On the other hand, if M is greater than the number of bits of a single TCAM word, then the bit vector can be partitioned into a series of sub-words, each of which is stored in a consecutive row of the TCAM array 300. For example, if M is 550 bits, the bit vector can be partitioned into a first sub-word that is stored in the first row of the TCAM array (256 bits), a second sub-word that is stored in the next, second row of the TCAM array (256 bits), and a third sub-word that is stored in the next, third row of the TCAM array (38 bits) along with the rest of the bits in the third row being stored as wildcard bits. The control module 120 can then partition the TCAM array 300 into the first portion having a size of three rows and the second portion having a size of the remaining rows of the TCAM array 300.

Referring to the latter example, the control module 120 can communicate with the address decoder 220 to select the first row of the TCAM array 300, and communicate the data of the first sub-word of the bit vector to the read/write circuit 240 so that the data of the first sub-word can be written to the first row. Similarly, the address decoder 220 can select the second row and the read/write circuit 240 can write the data of the second sub-word of the bit vector to the second row, and so forth. The control module 120 can also communicate with the address decoder 220 and the read/write circuit 240 to write the data of the set of TCAM words to the remaining rows of the TCAM array 300 (e.g., so that the set of TCAM words can be stored in the second portion of the TCAM array 300).

During compare operations, a match line, ML, indicates a match condition (e.g., assert logical high, or 1) for a corresponding TCAM row only if all TCAM cells 302 in that row match the search input (e.g., either hashed search word or the search word). For example, if the first two rows of the TCAM array 300 are designated as being the first portion to store the bit vector for a Bloom filter, the comparand register 230 can receive, as input, the hashed search word for the compare operation. In some examples, each of the match lines, ML, of each TCAM row can be coupled to a pre-charge circuit 310. The pre-charge circuit 310 can pre-charge the match line(s), ML, of row(s) that are to be searched during the compare operation. In this example, if the first two rows of the TCAM array 300 store the bit vector, the control module 120 (not shown in FIG. 3) can provide an enable signal to the pre-charge circuits 310 of the first two rows to pre-charge the corresponding match lines, ML, of the first two rows to a logical high (e.g., drive up to 1 from 0). The other remaining pre-charge circuits 310 can be prevented (via the control module 120 not asserting the enable signal) from pre-charging the match lines, ML, of the remaining rows of the TCAM array 300 (e.g., the rows corresponding to the second portion of the TCAM array 300 that stores the set of TCAM words), thereby preventing those rows from performing a search operation and reducing power consumption of the TCAM array 300 and of the search system as a whole.

The comparand register 130 can drive the data of the hashed search word to on the comparand line pairs CL/CLB and the first two rows of the TCAM array 300 can perform the compare operation to determine whether there is a match. If any TCAM cell 302 in the row does not match the hashed search word, the TCAM cell(s) 302 discharges the corresponding match line, ML, toward ground potential (e.g., logical low) to indicate the mismatch condition. Conversely, if all TCAM cells 302 match the hashed search word, the match line, ML, remains in a charged (e.g., logical high) state to indicate the match condition.

In some examples, such as described above, the bit vector for the Bloom filter can be stored in consecutive rows of TCAM cells 302, as the bit vector may be too large for a single row of TCAM cells 302. The TCAM device that utilizes the TCAM array 300 (e.g., TCAM device 200 of FIG. 2) can include additional circuitry that include elements, such as flip-flop circuit(s), to store the partial result of an ongoing search operation across individual rows of TCAM cells 302. The TCAM device can perform a search of the first portion of the TCAM array 300 using the hashed search word and cause the search operation to be performed iteratively, e.g., by first searching the initial sub-word of the bit vector in the first row, then progressively searching the next sub-word of the bit vector in the next row, and so forth, and finally combining the sub-word searching results to determine whether the hashed search word has is at bit positions that match the bit positions of the bit vector.

If the compare operation of the hashed search key with the bit vector of the Bloom filter indicates a match, the TCAM device can provide a match flag indicating a match to the control module 120. In response, the control module 120 can cause the TCAM device to perform a subsequent compare operation of the search word with the set of TCAM words stored in the second portion of the TCAM array 300. The control module 120 can provide an enable signal to the pre-charge circuits 310 of the rows of the second portion of the TCAM array 300 to pre-charge the corresponding match lines, ML, of these rows to a logical high (e.g., drive up to 1 from 0). The other pre-charge circuits 310 corresponding to the rows of the first portion of the TCAM array 300 can be prevented (via the control module 120 not asserting the enable signal) from pre-charging the corresponding match lines, ML. The TCAM device can provide a match signal to the control module if the search word is matched to a TCAM word(s) in the TCAM array 300.

FIGS. 3B and 3C are illustrations of the dynamically partitionable TCAM array in accordance with examples of FIGS. 1 and 2. In FIG. 3B, the control module 120 has partitioned the TCAM array 330 into a first portion 340 and a second portion 350. The first portion 340 can have a first word size (e.g., three TCAM words) that is sufficient to store the bit vector for a Bloom filter. Depending on implementation, the control module 120 can receive a value corresponding to a false positive rate (FPR) of searches that have been performed on the TCAM array 330. For example, for a specified number of searches (e.g., 100 total searches) with the current Bloom filter, a number of searches may result in a false positive result, where a search of the bit vector indicated a possible match in the set of TCAM words, but when the TCAM words are actually searched using the search word, no match is found. If the false positive rate is too high, for example, the control module 120 can determine that the current Bloom filter is inappropriately sized (e.g., is too small). Based on the value corresponding to the FPR (as well as information about the size of the TCAM array 330, information about the number of TCAM words to be stored in the TCAM array 330, power use information, and/or other information), the control module 120 can dynamically adjust the size of the Bloom filter (and therefore, adjust the first portion and the second portion sizes of the TCAM array 330) and reconstruct the Bloom filter accordingly (e.g., add more bits to the Bloom filter).

For example, as illustrated in FIG. 3C, based on the search result information, the control module 120 has dynamically adjusted the sizes of the portions of the TCAM array 330. The first portion 360 has a word size that is larger, for example, as compared to the previous first portion as seen in FIG. 3B (e.g., five TCAM words instead of three TCAM words). Similarly, the control module 120 has dynamically reduced the size of the second portion 370 in FIG. 3C accordingly.

As an addition or an alternative, while the TCAM array, such as described in FIGS. 1 through 3C, is shown as a single TCAM array, the TCAM array may include any number of TCAM array blocks that can be independently searched. For example, the search engine 110 of FIG. 1 can include a plurality of TCAM arrays that each individually stores both a set of TCAM words and a bit vector for a Bloom filter for the set of TCAM words. In this manner, because a separate Bloom filter can be stored in each TCAM array, the search engine 110 can perform a search operation for a hashed search word in each TCAM array in parallel (concurrently). The control module 120 can use information about the matching or mismatching of search words from the search engine and dynamically adjust individual Bloom filters (and the size of the first and second portions of individual TCAM arrays) when necessary.

Methodology

Figure 4A:
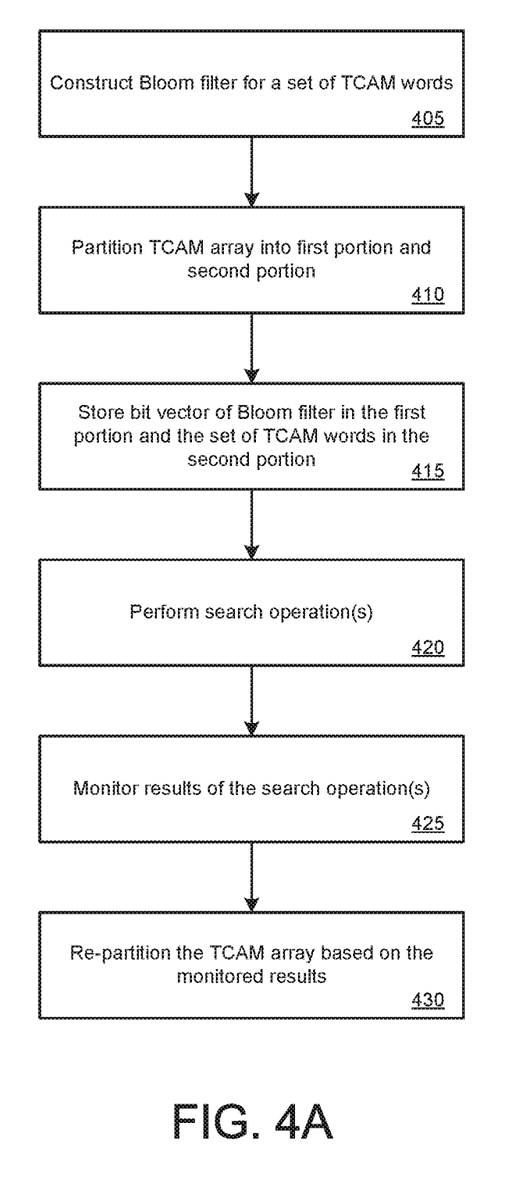
FIGS. 4A and 4B illustrate example flow charts for constructing a Bloom filter for a dynamically partitionable TCAM array and for performing search operations.
Figure 4B:
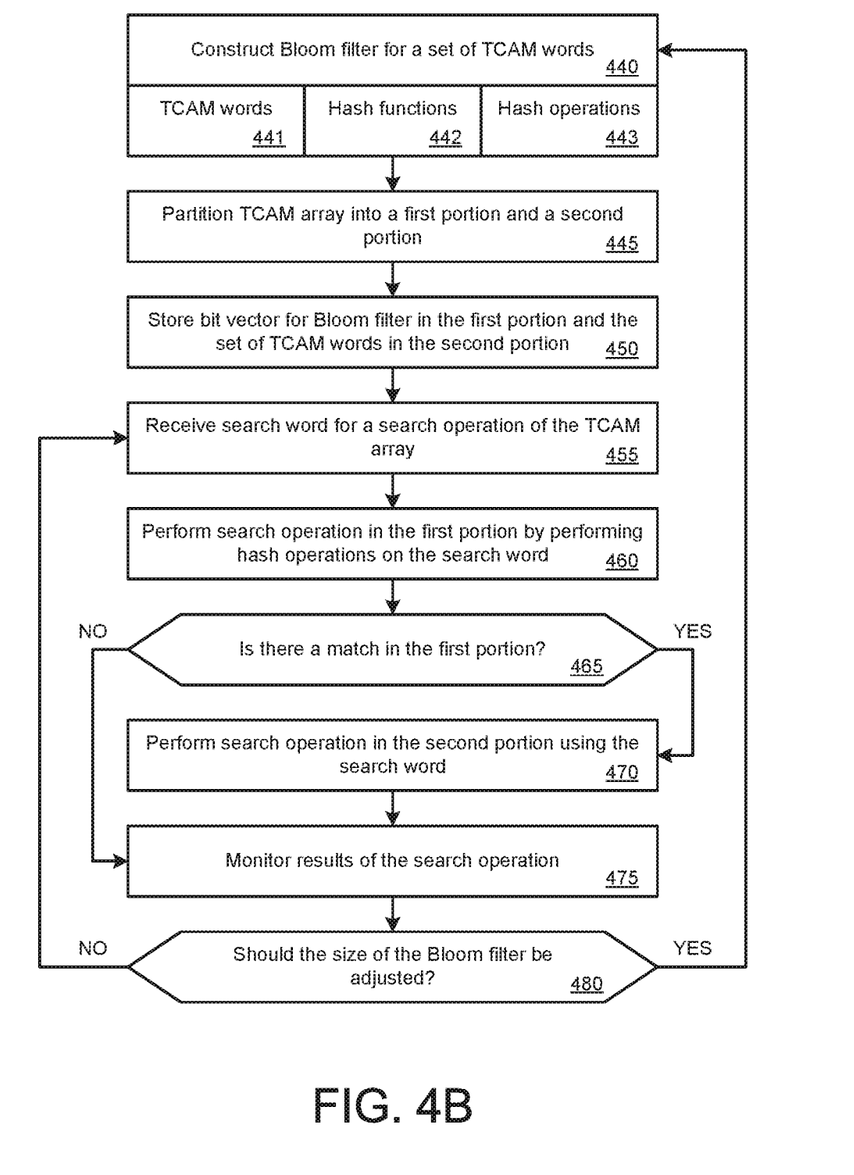

FIGS. 4A and 4B illustrate example flow charts for constructing a Bloom filter for a dynamically partitionable TCAM array and for performing search operations. Methods such as described by examples of FIGS. 4A and 4B can be implemented using, for example, components described with examples of FIGS. 1 through 3C. Accordingly, references made to elements of FIGS. 1 through 3C are for purposes of illustrating a suitable element or component for performing a step or sub-step being described.

In FIG. 4A, a Bloom filter can be constructed for a set of TCAM words (405). The set of TCAM words is to be stored in a TCAM array 115. The control module 120 can determine a bit vector for the Bloom filter by performing a plurality of hash function operations on each of the set of TCAM words. In one example, the control module 120 can also partition the TCAM array 115 into a first portion and a second portion (410). Although the example of FIG. 4A illustrates the step 410 being performed after step 405, in one example, the control module 120 can partition the TCAM array 115 based on the size of the bit vector and the size of the TCAM rows of the TCAM array 115 before (or concurrently with) constructing the Bloom filter.

The control module 120 can cause the search engine 110 to store the bit vector in the first portion of the TCAM array 115 and the set of TCAM words in the second portion of the TCAM array 115 (415). Once the data for the bit vector and the set of TCAM words are stored in the TCAM array 115, the control module 120 can perform search operations on the TCAM array 115 (420). According to an example, the control module 120 can receive an input stream that includes a data packet that is to be routed. The control module 120 can perform a search operation using a search word as a query to the search engine 110. The control module 120 can perform the plurality of hash function operations on the search word to obtain a hashed search word. The hashed search word can have a plurality of bits set to 1 (e.g., "logical high") in response to the plurality of hash operations being performed on the search word. The control module 120 can set the remaining bits of the hashed search word as "X" or "don't care" bits (e.g., so that the hashed search word has "1"s and "X"s). A first search operation is performed in which the bits that are set to a logical high (e.g., set as 1) of the hashed search word is compared to the corresponding bits of the bit vector stored in the first portion of the TCAM array 115. If the bits of the hashed searched word that are set to 1 match the bits of the bit vector at the corresponding positions that are also set to 1, then the search engine 110 provides a matching signal indicating to the control module 120 that the search word may be in the set of TCAM words stored in the second portion of the TCAM array 115. The control module 120 can then cause the second portion of the TCAM array 115 to be searched using the search word.

The control module 120 can monitor the results of the search operation(s) (425). Based on the monitored results, the control module 120 can determine that the Bloom filter and/or the size of the first portion that stores the bit vector needs to be adjusted, and can re-partition the TCAM array 115 accordingly (430).

FIG. 4B illustrates a more detailed flow chart for constructing a Bloom filter for a dynamically partitionable TCAM array and for performing search operations. A control module 120 of a search system 100 (see FIG. 1) can construct a Bloom filter for a set of TCAM words (440). The control module 120 can determine a set of TCAM words that are to be stored in a TCAM array 115 (441), identify one or more hash functions that are to be used in constructing the Bloom filter (442), and perform one or more function operations on each of the set of TCAM words using the identified one or more hash functions (443). The bit vector can be predefined or user-configured to have a specified number of bits (M-bits). For example, by performing K number of hash function operations on each of the set of TCAM words using K different hash functions, the bit vector can include a plurality of 1s at a plurality of positions (e.g., positions from 0 to M−1 bits).

The control module 120 can partition the TCAM array 115 into a first portion to store the bit vector and a second portion to store the set of TCAM words (445). The TCAM array 115 can be partitioned so that the size of the first portion is sufficient to store the bits of the bit vector for the Bloom filter. Although the example of FIG. 4B illustrates the step 445 being performed after step 440, in other examples, the control module 120 can partition the TCAM array 115 based on the size of the bit vector (M-bits) and the size of the TCAM rows of the TCAM array 115 before (or concurrently with) constructing the Bloom filter. The control module 120 can communicate with components of the search engine 110 to store the bit vector in the first portion and the set of TCAM words in the second portion of the TCAM array 115 (450).

After data is written to the TCAM array 115, the search system 100 can perform search operations on the TCAM array 115. The control module 120, for example, can receive a search word for performing a search operation on the TCAM array 115 (445). The control module 120 also performs the same one or more hash function operations on the search word using the identified one or more hash functions (460). The result of the one or more hash function operations on the search word can result in a hashed search word having one or more bits set to 1 (e.g., "logical high"). The remaining bits of the hashed search word can also be set as "X" or "don't care" bits. The control module 120 can also cause the search operation to be performed using the hashed search word on only the first portion of the TCAM array 115 by enabling rows of TCAM cells corresponding to the first portion to be searched while disabling the other rows of TCAM cells corresponding to the second portion from being searched.

If there is a match between the bits of the hashed search word and the bits of the bit vector in the first portion of the TCAM array 115 (465), the control module 120 can cause a subsequent search operation to be performed on the second portion of the TCAM array 115 using the search word (as opposed to using the hashed search word) (470). On the other hand, if there is no match, no additional search is performed. The Bloom filter has indicated that the search word is not found in the set of TCAM words stored in the second portion of the TCAM array 115 without the search system 100 having to perform the search operation on each of the rows of TCAM cells in the second portion. The control module 475 can continue to monitor and/or record information, such as the results of the search operation, for purposes of determining whether the current Bloom filter is appropriate for the search operations (475).

Based on the monitored results, the control module 120 can determine whether the size of the Bloom filter (and therefore, the sizes of the portions of the TCAM array 115) should be adjusted (480). If the Bloom filter is to be adjusted, the control module 120 can then dynamically re-construct the Bloom filter and dynamically re-partition the TCAM array 115 accordingly, based on the monitored results. On the other hand, if the Bloom filter does not have to be adjusted, the control module 120 can continue to perform search operations using the current Bloom filter and receive another search word for performing a search operation. In this manner, the search system can use the Bloom filter to reduce the number of search operations that are performed on the TCAM array 115, thereby improving the power efficiency of the TCAM array 115, and can also dynamically adjust the size of the Bloom filter in order to improve search efficiency of the TCAM array 115.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A method for operating a computing device, the method comprising:
    determining a bit vector for a Bloom filter by (i) determining a set of ternary content addressable memory (TCAM) words to store in a TCAM array, and (ii) performing one or more hash function operations on each of the set of TCAM words;
    partitioning the TCAM array into a first portion to store the bit vector and a second portion to store the set of TCAM words;
    storing (i) the bit vector in the first portion of the TCAM array, and (ii) the set of TCAM words in the second portion of the TCAM array; and
    performing a search of the TCAM array using a search word by (i) performing the one or more hash function operations on the search word to generate a hashed search word, and (iii) determining whether bits at specified positions of the hashed search word match bits at corresponding positions of the bit vector stored in the first portion of the TCAM array before searching the second portion of the TCAM array with the search word.

2. The method of claim 1, further comprising:
    determining that the bits at specified positions of the hashed search word do not match the bits at corresponding positions of the bit vector stored in the first portion of the TCAM array; and
    providing an indication that the search word does not match any of the TCAM words stored in the second portion of the TCAM array without searching the second portion of the TCAM array.

3. The method of claim 1, further comprising:
    determining that the bits at specified positions of the hashed search word match the bits at corresponding positions of the bit vector stored in the first portion of the TCAM array; and
    searching the second portion of the TCAM array with the search word.

4. The method of claim 1, further comprising:
    determining a value corresponding to a false positive rate of the Bloom filter; and
    dynamically re-partitioning a size of the first portion of the TCAM array and a size of the second portion of the TCAM array based on the value corresponding to the false positive rate.

5. The method of claim 1, wherein partitioning the TCAM array includes (i) determining a number of bits of the bit vector for the Bloom filter, (ii) determining that the number of bits of the bit vector for the Bloom filter is equal to or less than a number of bits in a TCAM word in the TCAM array, and (iii) determining that the first portion of the TCAM array is a size of one TCAM word and the second portion of the TCAM array is a remainder of the TCAM array.

6. The method of claim 1, wherein partitioning the TCAM array includes (i) determining a number of bits of the bit vector for the Bloom filter, (ii) determining that the number of bits of the bit vector for the Bloom filter is greater than a number of bits in a TCAM word in the TCAM array, and (iii) determining that the first portion of the TCAM array is a size of a plurality of TCAM words to store at least the number of bits of the bit vector and the second portion of the TCAM array is a remainder of the TCAM array.

7. A computing device comprising:
    a ternary content addressable memory (TCAM) device including a TCAM array, the TCAM array including a plurality of TCAM cells arranged in a plurality of rows and columns;
    a memory storing instructions; and
    a control circuit, coupled to the TCAM array and the memory, to execute the instructions, wherein the instructions, when executed, cause the computing device to:
        perform a plurality of hash function operations on each of a set of TCAM words to be stored in the TCAM array;
        generate a bit vector for a Bloom filter based on the plurality of hash function operations;
        store (i) the bit vector for the Bloom filter in a first portion of the TCAM array, the first portion of the TCAM array corresponding to a first number of rows of the plurality of rows, and (ii) the set of TCAM words in a second portion of the TCAM array, the second portion of the TCAM array corresponding to a remaining number of rows of the plurality of rows;
        receive a search word; and
        perform a search of the TCAM array by (i) performing the plurality of hash function operations on the search word to generate a hashed search word, and (ii) determining whether bits at specified positions of the hashed search word match bits at corresponding positions of the bit vector stored in the first portion of the TCAM array before searching the second portion of the TCAM array with the search word.

8. The computing device of claim 7, wherein each bit of the bit vector is stored in a corresponding TCAM cell in the first portion of the TCAM array.

9. The computing device of claim 7, wherein the TCAM array includes a plurality pre-charge circuits and a match line for each row of the plurality of rows, wherein each pre-charge circuit is coupled to a match line for each row, and wherein the instructions cause the computing device to determine whether the bits at specified positions of the hashed search word match the bits at corresponding positions of the bit vector by causing a first set of pre-charge circuits for the first number of rows to set the corresponding match lines to a logical high and causing a second set of pre-charge circuits for the remaining number of rows to set the corresponding match lines to a logical low.

10. The computing device of claim 9, wherein the instructions further cause the computing device to:
    determine that the bits at specified positions of the hashed search word do not match the bits at corresponding positions of the bit vector stored in the first portion of the TCAM array; and
    provide an indication that the search word does not match any of the TCAM words stored in the second portion of the TCAM array without searching the second portion of the TCAM array.

11. The computing device of claim 9, wherein the instructions further cause the computing device to:
    determine that the bits at specified positions of the hashed search word match the bits at corresponding positions of the bit vector stored in the first portion of the TCAM array; and
    search the second portion of the TCAM array with the search word by causing the first set of pre-charge circuits for the first number of rows to set the corresponding match lines to a logical low and causing the second set of pre-charge circuits for the remaining number of rows to set the corresponding match lines to a logical high.

12. The computing device of claim 11, wherein the instructions further cause the computing device to:
determine a value corresponding to a false positive rate of the Bloom filter; and
dynamically adjust a size of the first portion of the TCAM array and a size of the second portion of the TCAM array based on the value corresponding to the false positive rate, wherein adjusting the sizes of the first and second portions includes changing the first number of rows and the remaining number of rows.

13. The computing device of claim 12, wherein the TCAM device includes a counter that counts a number of times in which searching the second portion of the TCAM array resulted in a mismatch at every row in the second portion of the TCAM array.

14. The computing device of claim 7, wherein the instructions further cause the computing device to:
determine the set of TCAM words to be stored in the TCAM array by determining which TCAM words from a plurality of TCAM words are searched for more frequently during a predefined duration than other TCAM words from the plurality of TCAM words.

15. A non-transitory computer-readable medium storing instructions that, when executed by a processor of a computing device, causes the computing device to:
determine a plurality of hash functions to use for constructing a Bloom filter;
determine a bit vector for the Bloom filter by (i) determining a set of ternary content addressable memory (TCAM) words to store in a TCAM array, the TCAM array including a plurality of TCAM cells arranged in a plurality of rows and columns, and (ii) performing hash operations on each of the set of TCAM words using the plurality of hash functions;
partition the TCAM array into a first portion to store the bit vector and a second portion to store the set of TCAM words, wherein partitioning the TCAM array includes identifying an address for each row of the plurality of rows of the first portion to store the bit vector;
store (i) the bit vector in the first portion of the TCAM array, and (ii) the set of TCAM words in the second portion of the TCAM array;
receive a search word; and
perform a search of the TCAM array using the search word by (i) performing hashing operations to the search word using the plurality of hash functions to generate a hashed search word, and (ii) performing a compare operation between the hashed search word and the first portion of the TCAM array to determine whether bits at specified positions of the hashed search word match bits at corresponding positions of the bit vector stored in the first portion of the TCAM array before searching the second portion of the TCAM array with the search word.

* * * * *